United States Patent [19]

Szczepaniak et al.

[11] Patent Number: 5,623,850
[45] Date of Patent: Apr. 29, 1997

[54] APPARATUS FOR ASCERTAINING SELECTED CHARACTERISTICS OF SHEETS

[75] Inventors: Wolfram Szczepaniak, Sandhöhe; Harald Rann, Hamburg; Frank Hörnicke, Wedemark, all of Germany

[73] Assignee: E.C.H. Will GmbH, Hamburg, Germany

[21] Appl. No.: 614,312

[22] Filed: Mar. 12, 1996

[30] Foreign Application Priority Data

Mar. 24, 1995 [DE] Germany ............... 195 10 753.5

[51] Int. Cl.⁶ ............................................ G01N 21/86
[52] U.S. Cl. ............................................ 73l/159
[58] Field of Search ........................... 73/159, 865.8, 73/105; 356/376, 383, 384; 348/86, 88, 91, 92

[56] References Cited

U.S. PATENT DOCUMENTS

| 5,214,490 | 5/1993 | Abe et al. ............ 356/383 |
| 5,410,157 | 4/1995 | Davis ................ 356/383 |

FOREIGN PATENT DOCUMENTS

| 0358331A2 | 3/1990 | European Pat. Off. . |
| 1191390 | 4/1965 | Germany . |
| 1611378 | 12/1970 | Germany . |
| 2751422A1 | 6/1978 | Germany . |
| 3510328A1 | 10/1985 | Germany . |
| 3916405A1 | 11/1989 | Germany . |
| 3825295A1 | 2/1990 | Germany . |
| 4040494A1 | 6/1991 | Germany . |
| 4207070A1 | 9/1993 | Germany . |
| 3713525C2 | 1/1994 | Germany . |
| 4101436C2 | 2/1994 | Germany . |
| 3926660C2 | 4/1994 | Germany . |
| 4308620A1 | 9/1994 | Germany . |

OTHER PUBLICATIONS

Patents Abstracts of Japan–Paper Thickness Detector—P–750 Aug. 29, 1988, vol. 12/No. 317.
Patents Abstracts of Japan–Inspecting Device of Surface State—P–297 Aug. 29, 1984, vol. 8/No. 188.

*Primary Examiner*—Robert Raevis
*Attorney, Agent, or Firm*—Darby & Darby

[57] ABSTRACT

Apparatus for ascertaining the width, the length, the coarseness of cut edges and/or other selected characteristics of sheets of paper or the like has a sheet testing unit employing one or more cameras for the monitoring of a sheet which is maintained in a predetermined position at a predetermined location, a feeding unit which supplies sheets to be tested from a source of sheets to the predetermined location, and an evacuating unit which withdraws freshly tested sheets from the predetermined location. Signals denoting the results of tests can be used to regulate the operation of the machine or production line which makes and/or processes the sheets, and the evacuated satisfactory tested sheets can be returned into such machine or production line.

19 Claims, 2 Drawing Sheets

APPARATUS FOR ASCERTAINING SELECTED CHARACTERISTICS OF SHEETS

BACKGROUND OF THE INVENTION

The invention relates to the manipulation of flat bodies in general, and more particularly to the ascertainment or detection of certain characteristics of flat bodies including sheets of paper, cardboard, plastic or the like (hereinafter referred to as sheets or paper sheets). Still more particularly, the invention relates to apparatus for ascertaining one or more selected characteristics of sheets.

It is often desirable or necessary to ascertain certain selected or specific characteristics (such as the length, the width, the thickness, the color and/or the quality, e.g., coarseness of edge faces) of sheets which are being processed in various machines or production lines, for example, in machines for the making of pads or other stationery products or in machines for the making and wrapping or boxing reams or other accumulations of paper sheets.

It is customary to accumulate stacks (e.g., reams) of paper sheets by severing large paper sheets or piles of overlapping large paper sheets longitudinally and transversely to arrive at sheet formats of desired size. For example, large sheets can be drawn off rolls and advanced in a predetermined direction to be severed in as well as transversely of such direction in order to obtain sheets or panels having a desired length and a desired width. As a rule, or at least in many instances, a relatively wide (large) sheet is severed by one or more rotary knives while it is being advanced lengthwise so that the wide sheet yields two or more narrower sheets or strips having a width corresponding to the desired width or length of an ultimate sheet, and such strips are thereupon severed crosswise (e.g., again by one or more rotary knives) to convert each strip into a series of discrete sheets or into a series of discrete stacks of superimposed sheets.

The width, the length and the coarseness (or smoothness) of the edges are normally considered to constitute those characteristics or criteria of sheets which are most important as concerns the quality of stacks of sheets or the quality of stationery products embodying the sheets. If the width and/or the length of a sheet departs from a desired or predetermined value, it is necessary to change the position or positions of one or more longitudinal cutters or cross cutters which determine such dimensions of the ultimate products. On the other hand, if the edges of inspected sheets are too rough, this indicates to the operator or operators that certain cutter or cutters require sharpening or replacement. Thus, the number of rejects can be reduced considerably if certain characteristics of the sheets are inspected at least from time to time in order to ensure that any departures of actual characteristics from the desirable characteristics are eliminated as expeditiously as possible.

In order to ascertain the above-enumerated and/or other characteristics of paper sheets or other types of sheets, it is customary to manually withdraw, at random intervals, samples of sheets from a flow or stream of sheets or stacks of sheets and to subject the thus withdrawn sheets to a more or less rudimentary inspection with the naked eye. For example, it is known to employ patterns or templates having the desired width and length and to compare the sizes of such patterns with those of the spot checked sheets. As concerns the quality of edges (i.e., the sharpness of the knives which are used to subdivide larger sheets or strips into sheets of desired size), the roughness of such edges is compared with the corresponding characteristic of a sample sheet; such testing is carried out by touch and/or by visually comparing the characteristics of the edge or edges of a spot checked sheet with those of the sample sheet. In many instances, the thus spot checked sheets are categorized as having qualities corresponding to those of five or more different classes or groups or categories including a top class and a number of classes of lesser caliber.

A drawback of the just outlined conventional procedures which are being resorted to in order to ascertain one or more characteristics of sheets is that the results of such tests are not reliable because they are overly dependent upon the conscientiousness as well as upon the ability of the person or persons carrying out the tests to adequately judge the selected characteristics by touch and/or visually. Consequently, when the subjective conclusions of the tester or testers are being used to adjust and/or to replace certain component parts of the sheet making and/or processing machines or production lines, the adjustments are not always likely to result in any or in sufficient improvements in the quality of sheets. Furthermore, heretofore employed manual testing is time consuming and, unless performed by a number of persons, cannot be carried out at intervals which are sufficiently frequent to avoid the making of long series of unsatisfactory sheets or stacks of sheets or products embodying unsatisfactory sheets. Thus, it is desirable to alter the heretofore known testing or quality ascertaining procedures in order to ensure that the results of tests are more reliable than those which can be arrived at by subjective examination of randomly selected sheets.

OBJECTS OF THE INVENTION

An object of the invention is to provide a novel and improved apparatus # or ascertaining one or more selected characteristics of sheets.

Another object of the invention is to provide an apparatus which can test larger or smaller, wider or narrower, thicker or thinner and/or smoother or coarser sheets with the same degree of accuracy and reliability.

A further object of the invention is to provide an apparatus which can ascertain selected characteristics of paper sheets and/or other flat objects at a high frequency to thus reduce the number of rejects.

An additional object of the invention is to provide the apparatus with novel and improved means for testing paper sheets or the like.

Still another object of the invention is to provide the apparatus with novel and improved means for transporting, locating and evacuating sheets at a desired frequency and with a high degree of reproducibility.

A further object of the invention is to provide an apparatus which eliminates the need for subjective testing of sheets.

Another object of the invention is to provide an apparatus which can be utilized for automatic elimination of departures of actual or ascertained characteristics of tested sheets from the desired or optimal characteristics including, by way of example only, the length, the width, the thickness and/or the coarseness of the edges of paper sheets or other types of sheets.

An additional object of the invention is to provide an apparatus which can be installed in existing machines and/or production lines for the making and/or processing of paper sheets or the like.

Still another object of the invention is to provide a simple, compact and inexpensive but highly versatile apparatus which can be used for the testing of a variety of sheets of paper or the like.

A further object of the invention is to provide a novel and improved method of objectively testing selected characteristics of paper sheets or the like.

Another object of the invention is to provide a novel method of rapidly and accurately monitoring the width, the length and the coarseness of the edges of paper sheets or the like.

An additional object of the invention is to provide novel and improved modes of supplying sheets to and of evacuating sheets from one or more stations where the sheets are being tested for the determination of one or more selected characteristics.

Still another object of the invention is to provide a machine or production line which is used for the making and/or processing of paper sheets or the like and which embodies one or more testing apparatus of the above outlined character.

A further object of the invention is to provide an apparatus which can alert the attendant or attendants that the making and/or manipulation of sheets necessitates certain adjustments and/or interruptions.

Another object of the invention is to provide an apparatus which renders it possible to or which can introduce satisfactory tested sheets into a sheet making and/or processing machine or production line.

SUMMARY OF THE INVENTION

The invention is embodied in an apparatus for ascertaining at least one selected characteristic of paper sheets and/or other types of sheets. The characteristic or characteristics of the sheets to be tested can include, among others, the length, the width and the coarseness of one or more edges (e.g., the leading and/or trailing edges of sheets which were advanced in a predetermined direction).

The improved apparatus comprises a sheet testing unit having means for monitoring sheets to ascertain the at least one selected characteristic of the sheets being tested at a predetermined location, means for automatically supplying or advancing sheets from a source to the predetermined location and for preferably maintaining the thus supplied sheets in predetermined positions at the predetermined location, and means for evacuating monitored sheets from the predetermined location.

The means for supplying can include means for feeding to the predetermined location a series or file of discrete sheets which may but need not overlap each other.

The evacuating means can include means for withdrawing or expelling a succession of discrete monitored sheets from the predetermined location.

The source can include means for receiving and supporting at least one stack of overlapping or overlying sheets, and the means for supplying can include means for feeding to the predetermined location a series of successive discrete sheets from the at least one stack of overlapping sheets along a predetermined path and on to the predetermined location. The feeding means is or can be adjacent the receiving and supporting means and can include means for withdrawing individual successive sheets of the series of sheets from the at least one stack and for introducing the withdrawn individual sheets into the predetermined path for advancement of sheets through an outlet of the supplying means on to the predetermined location. In accordance with a presently preferred embodiment, the means for supplying includes a ramp which slopes from the source downwardly toward the predetermined location and defines at least a portion of the predetermined path in such a way that the sheets can slide along the ramp toward the predetermined position at the predetermined location. The means for supplying sheets from the source to the predetermined location and for maintaining the thus supplied sheets in predetermined positions at the predetermined location can further include lateral guide means (e.g., in the form of rails or analogous components) which flank the path of movement of sheets in a predetermined direction from the source to the predetermined location, and at least one stop arranged to arrest a sheet moving along the predetermined path on to the predetermined location. At least one component (such as a rail) of the guide means is preferably movable substantially transversely of the predetermined path in order to change the with of the path (as seen transversely of the predetermined direction), i.e., to enable the apparatus to ascertain the characteristics of wider or narrower sheets.

The sheet which reaches the predetermined location is preferably positioned and oriented in such a way that it has a leading edge and a trailing edge (as seen in the predetermined direction of advancement of sheets from the source to the predetermined location). The monitoring means can include at least one camera (such as a television camera) having means for generating signals which denote the characteristics of the leading edge and/or the trailing edge of a sheet at the predetermined location, and means (e.g., a suitable computer) for evaluating the signals which are being generated by the at least one camera. The apparatus can further comprise means for moving the at least one camera for adjustment relative to the predetermined location in and counter to the predetermined direction of advancement of sheets by the supplying means.

The evacuating means can comprise an intermittently or continuously driven evacuating conveyor and a device for transferring monitored sheets from the predetermined location to the evacuating conveyor. The latter can include at least one substantially roller-shaped or drum-shaped or wheel-shaped member which is rotatable about an axis disposed at a level above the aforementioned stop at the predetermined location and extending transversely of the (predetermined) direction of advancement of sheets from the source to the predetermined location. The transferring device can comprise a suitable biasing member (e.g., an idler roller or wheel) and means for moving the biasing member across the predetermined location to thus urge a sheet at the predetermined location against the at least one substantially roller-shaped member off the evacuating conveyor. The means for moving the biasing member can include a lever (e.g., a bell crank lever) which carries the biasing member, and means (e.g., a fluid-operated motor) for pivoting the lever in order to displace the biasing member between a first position beneath the predetermined location and a second position in which the biasing member temporarily maintains a sheet at the predetermined location in contact with the at least one substantially roller-shaped member so that the evacuating conveyor can remove the monitored sheet from the predetermined location. The arrangement is preferably such that the leading edge of a sheet at the predetermined location abuts the stop and such leading edge is lifted above and away from the stop during movement of the biasing member from the first position to the second position.

The improved apparatus can further comprise means for operating a sheet singularizing device of the supplying means and/or the aforementioned sheet transferring device of the evacuating means (or the entire evacuating means) as a function (i.e., in dependency upon the results) of the monitoring of sheets at the predetermined location.

The novel features which are considered as characteristic of the invention are set forth in particular in the appended claims. The improved apparatus itself, however, both as to its construction and its mode of operation, together with additional important novel features and advantages thereof, will be best understood upon perusal of the following detailed description of certain presently preferred specific embodiments with reference to the accompanying drawings.

DESCRIPTION OF PREFERRED EMBODIMENTS

Figure 1:
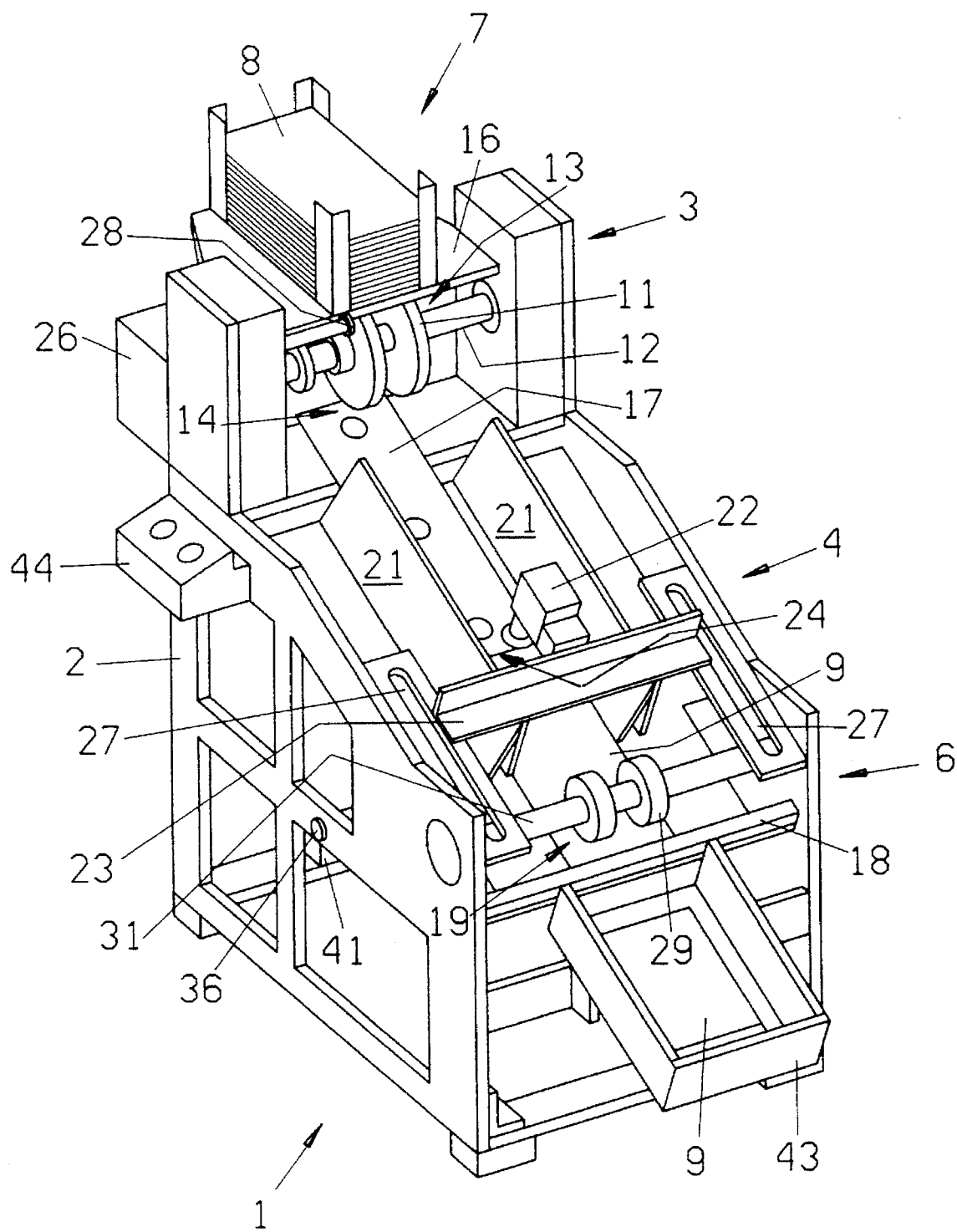
FIG. 1 is a somewhat schematic perspective view of an apparatus which embodies one form of the present invention.
Figure 2:
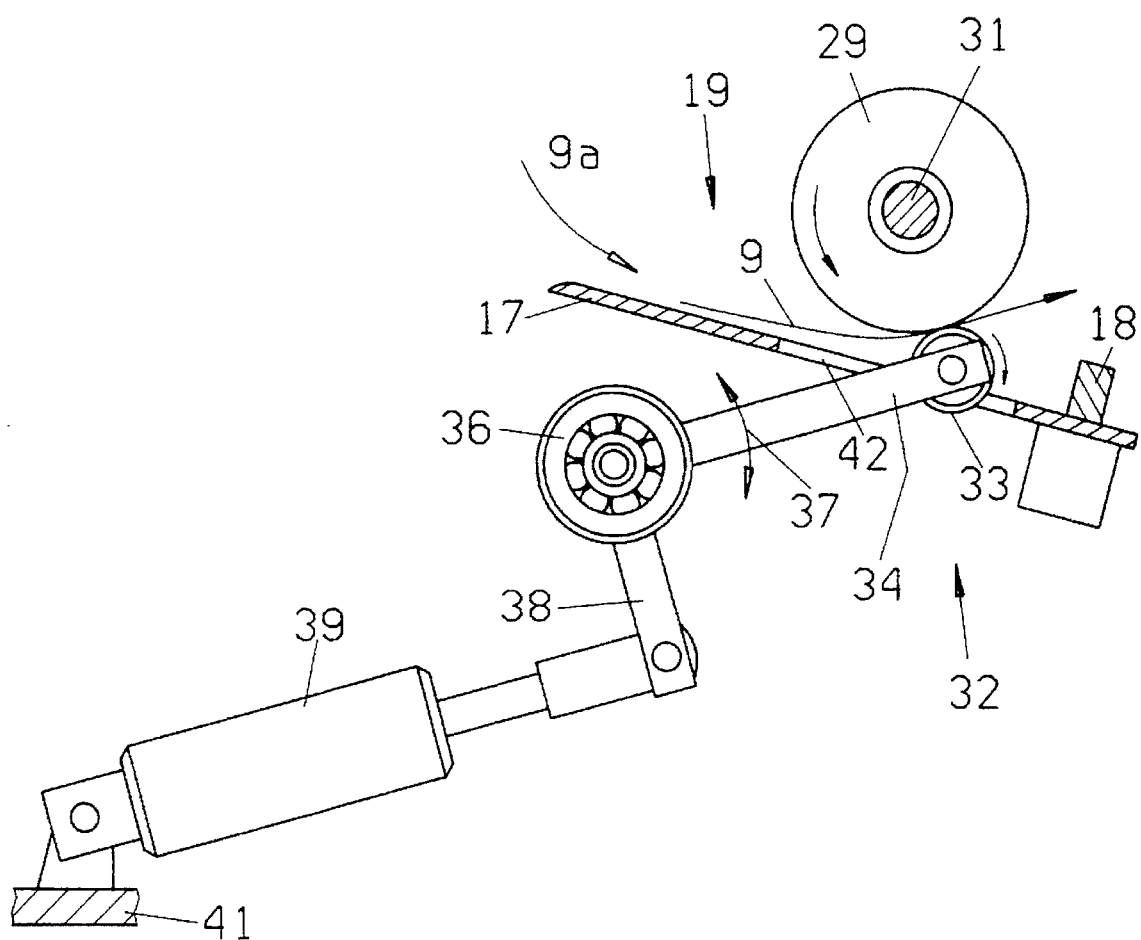
FIG. 2 is an enlarged partly side elevational and partly vertical sectional view of a portion of the sheet supplying means and of a portion of the sheet evacuating means of the apparatus.

The apparatus 1 which is shown in FIGS. 1 and 2 is used to ascertain one or more selected characteristics of sheets 9, e.g., paper sheets which are being made and processed in a machine or production line. For example, such machine or production line can subdivide large panels of paper into sheets 9 of a desired size and shape, to accumulate stacks (e.g., reams) of overlapping sheets, and to confine the stacks in wrappers, boxes, cartons or the like or to assemble stacks with cover sheets or panels into pads or other types of stationery products.

The apparatus 1 comprises a frame or housing 2 which supports a preferably automatic or automated sheet feeding or supplying unit 3, a sheet monitoring or testing unit 4, and a sheet ejecting or evacuating unit 6. The sheet feeding or supplying unit 3 comprises or cooperates with a source 7 of sheets 9 which are gathered into a stack 8 having an underside 13 (i.e., the bottom side of the lowermost sheet 9) resting on a platform 16 of the unit 3. The latter further comprises a sheet withdrawing and singularizing device having two intermittently driven rollers or wheels 11 mounted on a horizontal shaft 12 which receives torque from a prime mover, not shown (e.g., an intermittently driven electric motor). When driven by the shaft 12, the rollers 11 withdraw the lowermost sheet 9 of the stack 8 at the underside 13 of such stack and advance the thus withdrawn sheet 9 through an outet 14 onto the upper side of a ramp 17 sloping downwardly from the outlet 14 toward a predetermined location 19 (hereinafter called testing station) where the properly positioned sheet 9 can be tested by one or more cameras 22 of the testing unit 4. The leading edge of a sheet 9 which is properly positioned at the testing station 19 abuts a stationary (but preferably adjustable) stop 18 extending transversely of the direction of advancement of sheets 9 along the path which is defined by the ramp 17 and two lateral guide members 21.

The rollers 11 of the sheet withdrawing and singularizing device forming part of the sheet feeding or supplying unit 3 are provided with suitable means for reliably engaging and entraining successive lowermost sheets 9 of the atack 8. For example, the peripheral surfaces of the rollers 11 can be provided with mechanical entraining means in the form of grippers or tongs (not specifically shown) and/or with fluid-operated entraining means including suction ports connectable to a suitable suction generating device. A suction operated sheet withdrawing and singularizing device which can be utilized in the apparatus 1 as a component part of or in combination with the sheet feeding unit 3 is known as Type RSA 450-G which is produced and distributed by the Firm Pfannkuch Maschinen GmbH, Ahrensburg, Federal Republic Germany. The operation of the sheet withdrawing and singularizing device including the rollers 11 is or can be monitored by one or more sensors; one such sensor (e.g., a photoelectronic detector including a radiation source and a photoelectronic transducer) is shown in FIG. 1, as at 28. An important function of the sensor or sensors 28 is to ascertain whether or not the rollers 11 advance discrete (individual) sheets 9 from the stack 8 onto the ramp or chute 17 for sliding movement along the predetermined path defined by such ramp and to the predetermined position at the testing station 19. Simultaneous feeding of two or more partly or fully overlapping sheets 9 could result in the generation of signals denoting unsatisfactory sheets even though the individual sheets of a group of two or more simultaneously withdrawn sheets might be acceptable. Signals from the sensor or sensors 28 can be transmitted to a display for the generation of visualy detectable information for the attendant or attendants and/or for the generation of audible and/or other readily detectable signals. Furthermore, signals from the sensor or sensors 28 can be used to automatically interrupt the operation of the apparatus 1.

The supply of sheets 9 forming the stack 8 at the source 7 can be replenished at required intervals by hand or otherwise. For example, an operator can withdraw entire stacks (or portions of larger (taller) stacks) from a machine or production line wherein the stacks are being assembled and/or transported to a series of successive processing stations. It is equally within the purview of the invention to provide suitable automatic means for transferring stacks 8 of sheets 9 from a machine or production line into the sheet feeding unit 3 so that the delivery of sheets to the apparatus 1 need not be attended to or inspected at all. The details of the just discussed automatic stack or sheet transferring means for admission into the feeding unit 3 form no part of the present invention.

The width of the path for the sheets 9 along the upper side of the ramp 17 between the lateral guides 21 (e.g., two parallel metallic or plastic rails) is selected in such a way that the sheets can readily slide along the ramp 17 but are compelled to assume predetermined positions when their leading edges reach and are arrested by the stop 18. At least one of the components 21 of lateral guide means for the sheets 9 is preferably adjustable transversely of the direction of advancement of sheets 9 along the ramp 17 toward the stop 18 so that the apparatus can be rapidly converted to ascertain the characteristics of wider or narrower sheets.

The means for mounting the camera 22 of the testing unit 4 at the station 19 in an optimum position for determination of the characteristics of the leading edge (at 18) and/or the trailing edge 24 of a sheet 9 at such station includes a transverse guide or crosshead 23 which is disposed at a level above the testing station. The arrangement can be such that, when properly positioned by the crosshead 23, the camera 22 is oriented toward the trailing edge 24 of the sheet 9 occupying the testing station 19. The latter can be designed and set up to monitor the position as well as the condition (such as roughness or smoothness) of the trailing edge 24, and this camera then transmits appropriate signals to a signal processing or evaluating system 26 which can include or constitute a suitable computer.

By way of example only, the camera 22 can be a black-and-white television camera known as Model CF 4/1 which is produced and distributed by the Firm KAPPA Messtechnik GmbH, Federal Republic Germany. Several other types of sheet monitoring means (in the form of television cameras or other types of cameras) can be utilized with equal or similar advantage. The illustrated camera 22 is preferably designed to transmit to the evaluating system 26 signals denoting the length, the position and the condition of the trailing edge 24 of a sheet 9 which occupies the testing station 19.

The position of the camera 22 will or can be changed (if necessary) if the apparatus 1 is being set up to monitor the characteristics of larger or smaller, wider or narrower sheets. To this end, the crosshead 23 which mounts the camera 22 is preferably provided with followers (not specifically shown) extending into guide slots 27 provided in the adjacent portion of the housing 2 and serving to confine the crosshead 23 to movements in and counter to the direction of advancement of sheets 9 from the source 7, along the path which is defined by the ramp 17, and to the testing station 19 (i.e., into abutment with the stop 18). The crosshead 23 can be mounted in such a way that it remains in a selected position by friction or the apparatus 1 is furnished with suitable means for releasably locking the crosshead 23 in a selected position with reference to the housing 2 and stop 18.

Certain details of a presently preferred sheet ejecting or evacuating unit 6 are shown in the lower portion of FIG. 1 and in FIG. 2. The operation of the unit 6 is or can be automated so that a freshly tested sheet 9 can be immediately and automatically removed from the testing station 19, for example, for immediate reintroduction into the machine or production line serving to make and/or to manipulate sheets 9. The illustrated evacuating unit 6 comprises preferably continuously (uninterruptedly) driven sheet expelling or ejecting roller-shaped members 29 which can be said to constitute or to form part of a driven evacuating conveyor in the unit 6. The means for driving the roller-shaped members 29 (hereinafter called rollers) comprises a horizontal shaft 31 which is installed in the frame or housing 2 at a level above the stop 18 and above the testing station 19 and receives torque from an electric motor or another suitable prime mover (not shown). The axis of the shaft 31 extends at right angles to the direction of advancement of sheets 9 from the source 7 to the testing station 19 along the upper side of the ramp 17.

The evacuating unit 6 further comprises an intermittently operated sheet transferring device 32 having a sheet pressing or biasing member 33 in the form of an idler roll mounted at the free end of one arm of a bell crank lever 34 forming part of means for moving the member 33 between a first position at a level beneath the ramp 17 (i.e., below the testing station 19) and a second position (shown in FIG. 2) in which the member 33 has lifted the leading edge of a sheet 9 at the station 19 above and away from the stop 18 and urges such sheet against the continuously driven rollers 29 so that the sheet 9 is withdrawn from the station 19. The means for moving the member 33 between the first and second positions further comprises a horizontal shaft 36 serving as a fixed fulcrum for the bell crank lever, and a fluid-operated motor 39 (e.g., a pneumatically operated cylinder and piston assembly pivotably mounted on a portion or brace 41 of the housing 2) which is coupled to the other arm 38 of the bell crank lever and can rock the latter in directions indicated by a double-headed arrow 37. The reference character 42 denotes a window, a slot or an analogous opening or passage provided in the ramp 17 to permit movements of the biasing member 33 between its first or retracted position and the second position shown in FIG. 2.

That (lower) portion of the ramp 17 which is shown in FIG. 2 serves as a support for a portion of a sheet 9 which is maintained in a predetermined position at the testing station 19. The leading edge of such sheet abuts the stop 18.

FIG. 1 further shows a collecting receptacle 43 which is positioned to receive successive tested or monitored sheets 9 from the assembly including the continuously driven rollers 29 and the biasing member 33. The motor 39 causes the biasing member 33 to return to the first or retracted position below the opening 42 in the ramp 17 so that the testing station 19 can receive the next sheet (shown in FIG. 2, as at 9a).

FIG. 1 shows a control panel 44 with means for interfering (when necessary) with the operation of the motor for the shaft 31 and/or with the operation of the motor 39. Furthermore, the panel 44 comprises or can comprise controls for the afore-mentioned means (if provided) for automatically delivering stacks 8 of sheets 9 to the source 7, for adjusting the position of the camera 22 relative to the station 19 and/or for determining the frequency of delivery of sheets 9 onto the ramp 17.

The improved apparatus is susceptible of numerous additional modifications without departing from the spirit of the invention. For example, the apparatus can be designed for simultenous testing of two or more sheets at a time. Moreover, the apparatus can be designed to simultaneously test several sheets but in such a way that each of two or more testing stations is provided with means for testing different characteristics of the sheets being delivered thereto by a discrete sheet feeding unit or by a common sheet feeding unit. Still further, it is possible to arrange two or more testing stations in series and to ascertain one or more first characteristics at the first or foremost station, to ascertain one or more additional characteristics at the second or next-following station, and so forth. This would render necessary a multiplication of the units or components of units which are shown in FIGS. 1 and 2.

An important advantage of the improved apparatus is that the testing of a series of successive sheets 9 can be automated to any desired extent so that the sheets can be tested in rapid succession and objectively, i.e., without the need for reliance upon the conscientiousness and/or ability of one or more attendants. Testing of sheets in rapid succession is desirable and advantageous because this ensures that the defects can be detected as soon as they develop, i.e., that the number of rejects can be reduced to a minimum. In fact, any adjustments which are to be carried out in response to detection of defective sheets can be carried out automatically in response to signals from the evaluating unit or circuit 26.

The source 7 can be omitted if the sheet supplying unit 3 is provided or combined with a system which supplies sheets to the testing station 19 directly from a sheet making and/or processing machine or production line. However, the establishment of a source 7 in the improved apparatus 1 is often preferred because this ensures that the apparatus is less dependent upon or is entirely independent from the operation of the sheet making and/or processing machine or production line. Moreover, and particularly if the source 7 is designed to accommodate a relatively large supply of sheets 9, it is even less likely that an attendant would forget to replenish the supply of sheets 9 in time prior to expiration of such supply. In fact, it is possible to employ an alarm system which generates one or more signals when the suply of sheets 9 in the source 7 is nearly exhausted or is depleted to a predetermined level.

The ramp 17, the stop 18 and the sheet withdrawing and singularizing device including the rollers or wheels 11 of the sheet supplying unit 3 can be replaced with other suitable sheet withdrawing, singularizing and advancing devices capable of ensuring predictable delivery of individual sheets to the testing station 19. The illustrated unit 3 has been found to be simple, compact and reliable as well as versatile so that it can be used in conjunction with the testing of sheets having different sizes and/or shapes.

The adjustability of the camera 22 in and counter to the direction of advancement of sheets along the ramp 17 also contributes to the versatility of the improved apparatus.

An advantage of the illustrated sheet evacuating unit 6 is its simplicity as well as its reliability and compactness. Moreover, the operation of such evacuating unit can be automated to a desired extent and it is capable of rapidly evacuating larger, smaller, thicker and/or thinner sheets with the same degree of reliability and without affecting the shape and/or other desirable characteristics of the freshly tested sheets. As already mentioned above, the evacuating unit 6 can be used for delivery of tested sheets back into the machine or production line for the making and/or processing or sheets; alternatively, the unit 6 or its equivalent can be combined with a conveyor system which is designed to return tested sheets into a making and/or processing machine or production line.

The evaluating circuit or unit 26 exhibits the advantage that it can be utilized in conjunction with the camera 22 and with the controls at the panel 44 to operate the sheet singularizing means (including the rollers 11) and/or the sheet transferring device 32 (or the entire evacuating unit 6) as a function (i.e., in dependency upon the results) of monitoring of sheets 9 at the testing station 19. This is desirable and advantageous because the circuit 26 then ensures that the feeding of sheets 9 to the station 19 and the withdrawal of tested sheets from the station 19 is accurately related to the actual testing by the camera 22. Moreover, the just described mode of controlling the operation of the units 3 and 6 in response to signals from the circuit 26 renders it possible to take maximum advantage of the capacity of the testing unit 4.

A further important advantage of the improved apparatus (as well of the method which can be practiced by resorting to such apparatus) is that it is possible to simultaneously ascertain two or more different characteristics of the sheets. This contributes significantly to the versatility of the method and apparatus and renders it possible to rapidly ascertain two or more characteritics which are important to ensure the making and processing of high-quality sheets of paper or the like.

The camera 22 preferably utilizes so-called charge coupled devices which are semiconductor devices arrayed so that the electric charge at the output of one provides the input stimulus to the next.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the sheet monitoring art and, therefore, such adaptations should and are intended to be comprehended within the meaning and range of equivalence of the appended claims.

What is claimed is:

1. Apparatus for ascertaining at least one selected characteristic of a plurality of characteristics—including the length, the width and the coarseness of edges—of sheets, comprising a sheet testing unit having means for monitoring said sheets to ascertain the at least one selected characteristic of the sheets being tested at a predetermined location; means for automatically supplying sheets from a source to said location and for maintaining the thus supplied sheets in predetermined positions at said location, said source including means for receiving and supporting at least one stack of overlapping sheets and said means for supplying including means for feeding to said location a series of successive discrete sheets from the at least one stack of overlapping sheets along a predetermined path on to said location, said means for feeding including at least one ramp which slopes from said source downwardly toward said location and defines at least a portion of said path wherein the sheets can slide toward said location; and means for evacuating monitored sheets from said location.

2. The apparatus of claim 1, wherein said evacuating means includes means for withdrawing a succession of discrete sheets from said location.

3. The apparatus of claim 1, wherein said means for feeding is adjacent said receiving and supporting means and includes means for withdrawing individual successive sheets of said series from the at least one stack and for introducing the withdrawn individual sheets into said path for advancement of sheets through an outlet of said supplying means on to said location.

4. The apparatus of claim 1, wherein a sheet at said location has a front edge and a rear edge, as seen in a direction of advancement of sheets by said supplying means, said monitoring means including at least one camera having means for generating signals denoting the characteristics of at least one edge of the sheet at said location, and means for evaluating said signals.

5. The apparatus of claim 4, further comprising means for mounting said at least one camera for adjustment relative to said location in and counter to said direction of advancement of sheets by said supplying means.

6. The apparatus of claim 1, wherein said evacuating means comprises a driven evacuating conveyor and a device for transferring monitored sheets from said location to said evacuating conveyor.

7. The apparatus of claim 6, wherein said conveyor includes at least one substantially roller-shaped member rotatable about an axis disposed at a level above a stop for sheets at said location and extending transversely of a direction of advancement of sheets from said source to said location.

8. The apparatus of claim 1, further comprising means for operating a sheet singularizing device of said supplying means and a sheet transferring device of said evacuating means in dependency upon the results of the monitoring of sheets at said location.

9. The apparatus of claim 1, further comprising means for operating a sheet singularizing device of said supplying means and said evacuating means in dependency upon the results of the monitoring of sheets at said location.

10. Apparatus for ascertaining at least one selected characteristic of a plurality of characteristics—including the length, the width and the coarseness of edges—of sheets, comprising a sheet testing unit having means for monitoring said sheets to ascertain the at least one selected characteristic of the sheets being tested at a predetermined location; means for automatically supplying sheets from a source to said location and for maintaining the thus supplied sheets in predetermined positions at said location, said means for supplying sheets from said source and for maintaining the thus supplied sheets in predetermined positions including lateral guide means flanking a path for movement of sheets in a predetermined direction from said source to said location and at least one stop arranged to arrest a sheet moving along said path to said location; and means for evacuating monitored sheets from said location.

11. The apparatus of claim 10, wherein said means for supplying includes means for feeding to said location a series of discrete sheets.

12. The apparatus of claim 10, wherein said guide means includes at least one component which is movable substantially transversely of said path so as to change the width of said path, as seen transversely of said predetermined direction.

13. Apparatus for ascertaining at least one selected characteristic of a plurality of characteristics—including the length, the width and the coarseness of edges—of sheets, comprising a sheet testing unit having means for monitoring said sheets to ascertain the at least one selected characteristic of the sheets being tested at a predetermined location; means for automatically supplying sheets from a source to said location and for maintaining the thus supplied sheets in predetermined positions at said location; and means for evacuating monitored sheets from said location, comprising a driven evacuating conveyor and a device for transferring monitored sheets from said location to said evacuating conveyor, said conveyor including at least one substantially roller-shaped member rotatable about an axis disposed at a level above a stop for sheets at said location and extending transversely of a direction of advancement of sheets from said source to said location.

14. The apparatus of claim 13, wherein said source includes means for receiving and supporting at least one stack of overlapping sheets and said means for supplying includes means for feeding to said location a series of successive discrete sheets from the at least one stack of overlapping sheets along a predetermined path on to said location.

15. The apparatus of claim 14, wherein said means for supplying includes a ramp which slopes from said source downwardly toward said location and defines at least a portion of said path wherein the sheets can slide toward said location.

16. The apparatus of claim 13, wherein said means for supplying sheets from said source and for maintaining the thus supplied sheets in predetermined positions includes lateral guide means flanking a path for movement of sheets in a predetermined direction from said source to said location and at least one stop arranged to arrest a sheet moving along said path to said location.

17. The apparatus of claim 13, wherein said transferring device comprises a biasing member and means for moving said biasing member across said location to urge a sheet at said location against said at least one substantially roller-shaped member of said evacuating conveyor.

18. The apparatus of claim 17, wherein said means for moving said biasing member includes a lever carrying said biasing member and means for pivoting said lever to displace said biasing member between a first position beneath said location and a second position in which said biasing member maintains a sheet at said location in contact with said at least one substantially roller-shaped member.

19. The apparatus of claim 18, wherein a leading edge of a sheet at said location abuts said stop and said leading edge of the sheet at said location is lifted above and away from said stop during movement of said biasing member from said first position to said second position.

* * * * *